US008895893B2

(12) United States Patent
Perret et al.

(10) Patent No.: US 8,895,893 B2
(45) Date of Patent: Nov. 25, 2014

(54) PROCESS CHAMBER AND METHOD FOR PROCESSING A MATERIAL BY A DIRECTED BEAM OF ELECTROMAGNETIC RADIATION, IN PARTICULAR FOR A LASER SINTERING DEVICE

(75) Inventors: Hans Perret, Munich (DE); Jochen Philippi, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 1080 days.

(21) Appl. No.: 11/886,102

(22) PCT Filed: Feb. 16, 2007

(86) PCT No.: PCT/EP2007/001390
§ 371 (c)(1),
(2), (4) Date: Sep. 10, 2007

(87) PCT Pub. No.: WO2007/112808
PCT Pub. Date: Oct. 11, 2007

(65) Prior Publication Data
US 2009/0266803 A1  Oct. 29, 2009

(30) Foreign Application Priority Data
Mar. 28, 2006 (DE) .......................... 10 2006 014 694

(51) Int. Cl.
*B23K 26/00* (2014.01)
*B23K 26/12* (2014.01)
*B29C 67/00* (2006.01)
*B23K 26/14* (2014.01)
*B22F 3/105* (2006.01)

(52) U.S. Cl.
CPC ............... *B23K 26/12* (2013.01); *B23K 26/127* (2013.01); *B22F 2003/1056* (2013.01); *B29C 67/0077* (2013.01); *B23K 26/123* (2013.01); *B23K 26/1464* (2013.01); *B22F 3/1055* (2013.01); *B22F 2998/00* (2013.01)
USPC .................................. 219/121.86; 219/121.85

(58) Field of Classification Search
USPC .............. 219/121.6, 121.85, 121.86; 425/174
See application file for complete search history.

(56) References Cited

U.S. PATENT DOCUMENTS 4,491,717 A  1/1985  Geffroy et al.
5,756,962 A  5/1998  James et al.
(Continued)

FOREIGN PATENT DOCUMENTS

DE  198 53 947 C1  2/2000
FR  2 499 297  6/1982
(Continued)

*Primary Examiner* — Dana Ross
*Assistant Examiner* — John J Norton
(74) *Attorney, Agent, or Firm* — Seyfarth Shaw LLP

(57) ABSTRACT

A process chamber for a processing of a material by means of a directed beam of electromagnetic radiation is provided, which comprises an optical element (9) for coupling the beam (7) into the process chamber (10), wherein the optical element has a surface (9a) facing the inside of the process chamber, a wall section (12) surrounding the optical element (9), a first inlet (16) for a gas that is arranged at one side of the optical element (9) and designed such that an escaping first gas flow (18) strokes substantially tangentially over the surface (9a) of the optical element (9), a second inlet (23) for a gas, which is designed and arranged such that an escaping second gas flow (25) flows at a distance to the surface (9a) in substantially the same direction as the first gas flow (18).

13 Claims, 2 Drawing Sheets

(56) References Cited

U.S. PATENT DOCUMENTS

| | | | |
|---|---|---|---|
| 5,876,767 A * | 3/1999 | Mattes et al. | 425/174.4 |
| 5,938,954 A * | 8/1999 | Onuma et al. | 219/121.84 |
| 5,977,515 A | 11/1999 | Uraki et al. | |
| 6,180,186 B1 * | 1/2001 | Choy et al. | 427/510 |
| 6,215,093 B1 * | 4/2001 | Meiners et al. | 219/121.61 |
| 6,339,205 B1 | 1/2002 | Nakayama | |
| 6,583,379 B1 | 6/2003 | Meiners et al. | |
| 2006/0192322 A1 | 8/2006 | Abe et al. | |

FOREIGN PATENT DOCUMENTS

| | | | |
|---|---|---|---|
| JP | 3-177699 A | | 8/1991 |
| JP | 05-192782 A | | 8/1993 |
| JP | 05192782 A | * | 8/1993 |
| JP | 9-511693 A | | 11/1997 |
| JP | 11267876 A | | 5/1999 |
| JP | 11267876 A | * | 10/1999 |
| JP | 2000-214286 A | | 8/2000 |
| JP | 2000-263276 A | | 9/2000 |
| JP | 2000263276 A | * | 9/2000 |
| JP | 2002192374 A | * | 7/2002 |
| JP | 2002-530202 A | | 9/2002 |
| JP | 2002-192374 A | | 10/2002 |
| JP | 20022192374 A | | 10/2002 |
| JP | 2004-277878 A | | 7/2003 |
| RU | 2 132 761 | | 7/1999 |
| RU | 2 143 964 C1 | | 10/2000 |
| RU | 2 265 507 C2 | | 10/2005 |
| WO | 9208592 A1 | | 5/1992 |
| WO | WO 95/11101 | | 4/1995 |
| WO | WO 97 06918 | | 2/1997 |
| WO | WO 00/30789 | | 6/2000 |
| WO | 01/74528 A1 | | 10/2001 |
| WO | WO2005072904 A1 | | 8/2005 |

* cited by examiner

PROCESS CHAMBER AND METHOD FOR PROCESSING A MATERIAL BY A DIRECTED BEAM OF ELECTROMAGNETIC RADIATION, IN PARTICULAR FOR A LASER SINTERING DEVICE

BACKGROUND OF THE INVENTION

The invention is related to a process chamber and a method for processing a material by a directed beam of electromagnetic radiation, in particular for a laser sintering device.

A laser sintering device comprises in a known manner a laser and a process chamber, in which the object to be manufactured is built, as well as a coupling window for coupling the laser beam into the process chamber.

When the laser locally hits the powder material and when the powder material is heated, an evaporation of small amounts of material may occur. In the process the evaporated material or constituents of the same or also chemical reaction products as well as dust particles suspended in the atmosphere of the process chamber deposit at the coupling window. This leads to a reduction of the transparency of the coupling window and accordingly to a decrease of the intensity of the laser beam.

From WO 97/06918 a laser sintering device is known, in which a nozzle for introducing a gas for blowing the coupling window is provided, which is annularly surrounding the coupling window on the side of the coupling window facing the process chamber. The gas flow is tangentially to the surface of the coupling window.

However, in the known device the surface of the coupling window does not stay clean all over. Also, temperature gradients between the coupling window and the blowing gas on the one hand and the gas within the process chamber on the other hand may lead to interfering beam deflections. The blowing gas may be supplied from a single side in order to alleviate the second problem. However, this leads to a more rapid deposition of dirt on the top surface of the coupling window.

From DE 198 53 947 C1 a process chamber for selective laser melting is known, wherein a protective gas is introduced into the process chamber via a first inlet, so that it flows across the working surface. Also, second inlets for a second lighter gas, which is annularly supplied, are provided in an elevated region of the process chamber, where the coupling window is located. Thereby, within the elevated region a kind of buffer volume of the second lighter gas is formed, by which vapours that are produced in the work zone are kept away from the coupling window. However, the problem of an interfering beam deflection due to a temperature gradient is not solved by this.

BRIEF SUMMARY OF THE DISCLOSURE

It is an object of the invention to provide a process chamber and a method for processing a material by a directed beam of electromagnetic radiation, in particular for a laser sintering device, wherein the coupling window is effectively protected against contaminations and wherein the problem of a beam deflection due to temperature gradients close to the coupling window is minimized.

The object is achieved by a process chamber according to the disclosure.

The device according to the present disclosure has the advantage that the lower gas flow is directed away from the coupling window. Thereby it is possible to improve the separation of the dirt-loaded gas, which rises from the processing surface, from the coupling window. Thereby the optical surface can be kept clean in a better way. Moreover, beam deflections may be avoided to a large extent even when there are temperature gradients between the blowing gas and the process chamber gas.

BRIEF DESCRIPTION OF THE SEVERAL VIEWS OF THE DRAWING

Further features and suitabilities of the invention arise from the description of embodiments on the basis of the figures, where.

DETAILED DESCRIPTION OF EMBODIMENTS OF THE INVENTION

Figure 1:
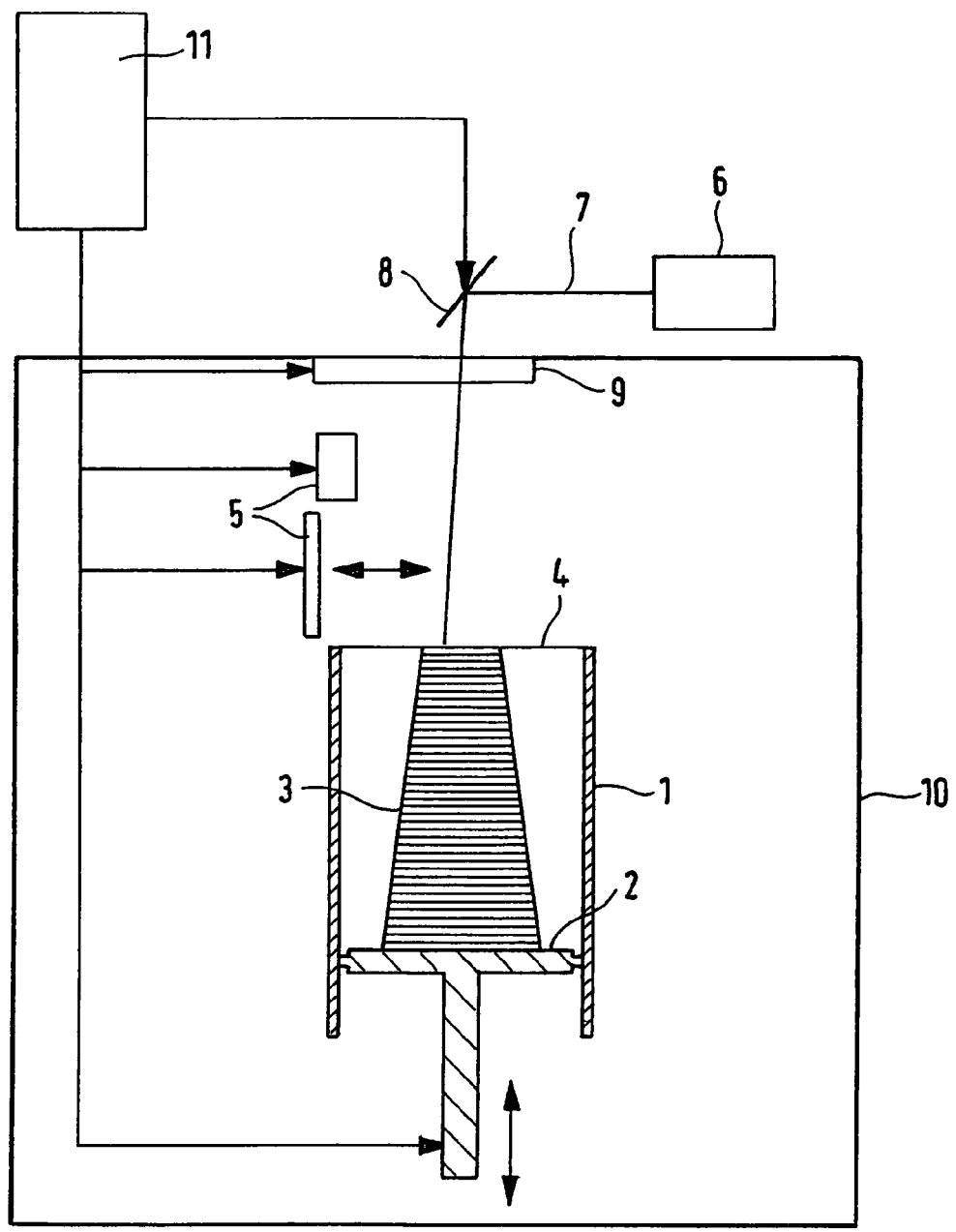
FIG. 1 shows a schematic representation of a laser sintering device.

FIG. 1 shows a laser sintering device, which is an embodiment of a device for a layer-wise manufacturing of a three-dimensional object. The laser sintering device comprises a container 1, which is open to the top and has a support 2 that can be moved in it in a vertical direction and supports the object 3 to be formed. The support 2 is adjusted in a vertical direction such that a layer of the object to be solidified at a time lies within a working plane 4. Further, an application device 5 for applying the building material, which is in powder form and can be solidified by electromagnetic radiation, is provided. Also, the device comprises a laser 6. The laser beam 7, which is generated by the laser, is directed to a coupling window 9 by means of a deflection device 8 and is transmitted by the coupling window 9 into the process chamber 10 and is focussed in a predetermined point within the working plane 4.

For instance the coupling window 9 may be provided in the top wall of the process chamber 10, when the device is arranged in such a way that the laser beam may enter the process chamber from the top and the object 3 is manufactured in a vertical direction. The coupling window 9 is made from a material that is transparent for the laser beam such as glass or transparent plastic. Also, the process chamber 10 can have an inlet, which is not shown, for a gas in order to maintain a certain atmosphere above the working plane such as an inlet for an inert gas as for example nitrogen.

Also, a control unit 11 is provided, by which the components of the device are controlled in a coordinated manner for carrying out the manufacturing process.

Figure 2:
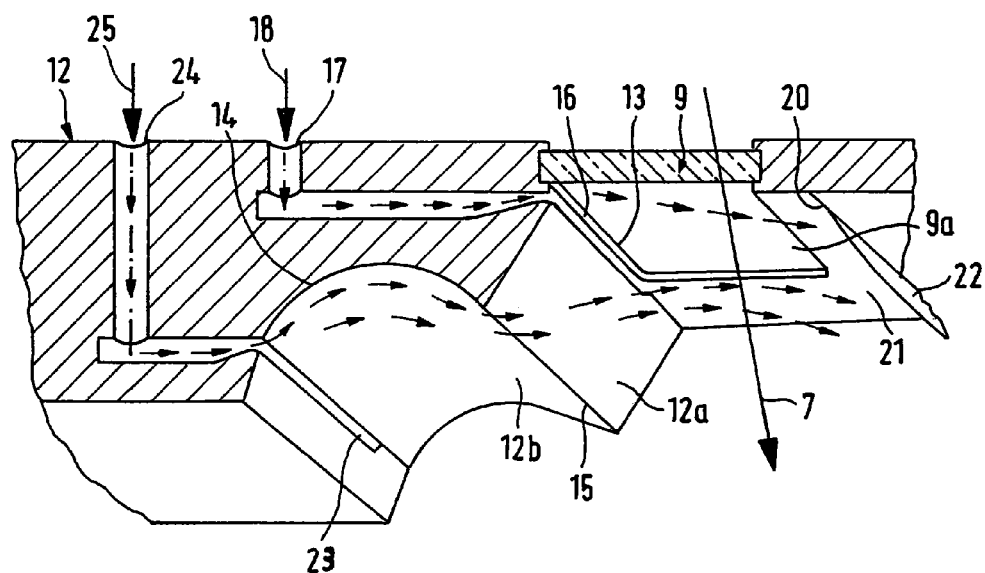
FIG. 2 shows a perspective sectional representation of a region of the process chamber that contains the coupling window.

FIG. 2 shows an enlarged detail of the process chamber 10 around the coupling window 9 in a sectional perspective view. In the embodiment that is shown the coupling window 9 is formed to be a rectangular window. It can itself be an optical element such as a lens or a lens system for focussing the laser beam into the working plane. However, it can also be a protective window, which is transparent for the laser beam, for protecting an optical element that is lying behind it.

The coupling window 9 is mounted in a wall section 12 of the top wall such that it tightly seals the process chamber in the upper region. Also, it has a surface 9a facing the working plane 4.

As can be seen in FIG. 2, the wall section 12 has a first slanted section 12a, which is adjoining to a longitudinal side 13 of the coupling window, wherein the slanted surface of the first slanted section 12a extends under an angle from the coupling window 9. A section 12b, which substantially is a hollow cylinder or is in the shape of a section of a hollow cylinder is provided adjacent to the slanted section 12a, wherein the cylinder axis extends in parallel to the longitudinal side 13 of the coupling window. Preferably, the apex 14 of the hollow cylinder section is located at a higher level than the edge 15 of the slanted section 12a, so that the second wall section 12b has a groove-like structure. The sections 12a, 12b extend substantially along the whole longitudinal side 13 of the coupling window or extend slightly beyond it.

At the end of the slanted region 12a of the wall section 12 that is facing the coupling window 9 a first gap 16 is provided, which substantially extends along the longitudinal side 13 of the coupling window and is connected to a first inlet bore 17 for a first gas supply. The connection to the first gas supply can be designed such that it is disconnectable, for example by a valve. The first gap 16 has a width and a geometry, which are adjusted such that a supplied first gas 18 substantially strokes tangentially over the surface 9a of the coupling window from one longitudinal side 13 to the opposite longitudinal side 20.

The wall section 12 of the process chamber also comprises a first substantially horizontal wall region 21 in the region opposite to the first gap 16 adjacent to the opposite longitudinal side 20 of the coupling window as well as a slanted region 22 adjoining it. Thereby it is made possible that the first gas 18, which is streaming in through the first gap 16, is substantially stroking tangentially over the whole surface 9a of the coupling window and is subsequently led away from the coupling window by the slanted surface 22.

In the second wall section 12b a second gap 23 is provided, which extends in parallel to the first gap 16 and substantially extends along the whole longitudinal side 13 of the coupling window or extends beyond it. The second gap 23 is connected to a second inlet bore 24, which is connected to a gas supply for a second gas 25. Also the second gas supply may be designed such that it is disconnectable. The second gap 23 is arranged in the wall section 12b, which has the shape of a hollow cylinder section, in a region away from the coupling window, so that the gas 25 escaping from the gap 23 at first flows into the groove that is formed by the section in the shape of a hollow cylinder. The second gap 23 is arranged below the first gap 16, when the coupling window 9 in a vertical direction is located above the working plane 4.

The angle under which the slanted wall section 12a runs with respect to the hollow cylindrical section 12b is set such that the beam path is not impaired.

Moreover, in the process chamber an opening for discharging the gas flows, which is not shown, is provided, which may be connected to a suction mechanism.

Nitrogen may be used as first gas and as second gas. However, it is also possible to use other gases depending on the area of application. The first and the second gas may also be different from each other.

The wall sections of the process chamber, which are defining the short sides of the coupling window, may substantially be horizontal, so that the gas flows, which are generated by means of the first and the second gap, are not swirled by structures.

A control is optionally provided, which may control the gas flows 18, 25 independently or in dependence from each other with respect to the flux and/or the velocity.

In operation the three-dimensional object is generated layer by layer by solidifying a powdery building material by means of the laser beam. The first gap 16 and the second gap 23 are connected to the gas supply, so that gas streams into the process chamber through the gaps 16, 23. The gas 18 streaming in through the first gap flows tangentially alongside the surface 9a of the coupling window 9 that is facing the working plane and is led away at the opposite side. Thereby, the gas can prevent the access to the surface 9a of the coupling window and thus can keep clean the surface.

The second gas 25 streaming in through the second gap 23 due to the arrangement and design of the gap 23 flows substantially alongside the inner surface of the hollow cylindrical-shaped section 12b and obtains a downward momentum towards the working plane, when it approaches the edge 15 between the first slanted section 12a and the hollow cylindrical section 12b. After having passed the edge 15, the gas flows with a distance to the surface substantially in parallel alongside the surface 9a. By the groove-like design of the section 12b the lower gas flow 25 is kept at a distance to the surface of the coupling window. Thus, two substantially laminar flows are obtained that marginally mix. As a result the separation of dirt-loaded gas may be improved as the gas rising from the working plane, which contains condensates and/or dust particles or other contaminations, is prevented by the gas flows from advancing to the optical element. Moreover, a beam deflection due to a temperature gradient is remarkably reduced due to the lower gas flow 25. Thus the surface 9a is kept sufficiently clean and also the beam deflection is minimized.

Variations of the device are possible. The coupling window does not necessarily have to be formed as rectangle. Rather, it can for example also be square-shaped, circular-shaped or oval or may have another shape. However, the effect is improved, when the gaps for the gas supply and the corresponding sides of the coupling window are substantially in parallel. The first gap 16 and the second gap 23 are preferably slightly broader than the longitudinal side of the coupling window. However, they also may be shorter, though then the coupling window is not sufficiently stroked by the gas at the edges.

The shapes of the wall sections 12a and 12b may also be differently designed. The slanted surface 12a may for example also be convex with respect to the inside of the process chamber. The groove-like surface 12b need not necessarily have the shape of a cylinder section. Rather, every other shape may be used that forms a groove for the gas flow.

It is also possible to dispense with the groove-like wall section 12b and instead form the second gap 23 in such a way that the escaping gas gets a momentum directed away from the coupling window.

The invention is also applicable to other devices for a layer-wise manufacturing of three-dimensional objects, for example a laser melting device, in which the powdery, in most cases metallic, building material is smelted by the laser, as well as other processing devices, in which gases or vapours occur in a process chamber that may contaminate a coupling window.

The invention claimed is:

1. Process chamber for a processing of a material by means of a directed beam of electromagnetic radiation comprising:
an optical element arranged in a plane for coupling the beam into the process chamber, wherein the optical element has a surface that is facing the inside of the process chamber,
a wall section surrounding the optical element in said plane, wherein the wall section has a first section adjoining to a first side of the optical element, the first section being a slanted section the surface of which extends under an angle from said plane or a convex section which is convex with respect to the inside of the process chamber, and a second section adjoining the first section, the second section being a hollow section having the shape of a hollow cylinder section or any other shape forming a groove, an axis of the hollow cylinder section or groove extending substantially in parallel to the first side of the optical element, a first inlet for a gas, which is arranged at said first section at a position facing the optical element and which is directed substantially tangentially to the surface of the optical element, and a second inlet for a gas, which is arranged at a position at said second section opposite to the position where said second section adjoins said first section and which is directed substantially in the same direction as the first inlet.

2. Process chamber according to claim 1, characterized in that the inlets are arranged one below the other.

3. Process chamber according to claim 1, characterized in that the first gas flow and the second gas flow are substantially laminar.

4. Process chamber according to claim 1, wherein one inlet or both inlets are slit-shaped.

5. Process chamber according to claim 1, characterized in that the second inlet in an operational position is located below the first inlet.

6. Process chamber according to claim 1, characterized in that the directed beam is a laser beam.

7. Process chamber according to claim 1, wherein said first section and said second section extend substantially along the whole side of the optical element or extend slightly beyond it.

8. Process chamber according to claim 1, wherein said first inlet for a gas is a first gap extending substantially along the first side of the coupling window.

9. Process chamber according to claim 8, wherein said second inlet for a gas is a second gap extending in parallel to the first gap substantially along the first side of the coupling window or beyond it.

10. Process chamber according to claim 1, wherein said wall section also comprises a flat wall region adjoining to a second side of the optical element which is opposite to the first side, the flat wall region being substantially parallel to the plane of the optical window, a slanted wall region adjoining to the flat wall section at a side opposite to the optical element, the surface of the slanted wall region extending under an angle from the plane of the flat wall section.

11. Method for processing a material by means of a directed beam of electromagnetic radiation having the steps:

directing a directed beam of electromagnetic radiation through a coupling window into a process chamber, wherein the coupling window has a surface that is facing the inside of the process chamber, supplying a first gas flow into the process chamber such that the first gas flow coming from a first side is substantially tangentially stroking over the surface of an optical element from the first side to a second side opposite the first side, and supplying a second gas flow into the process chamber such that the second gas flow flows at a distance to the surface in substantially the same direction as the first gas flow, wherein a process chamber for a processing of a material by means of a directed beam of electromagnetic radiation is used, the process chamber comprising:

the optical element arranged in a plane for coupling the beam into the process chamber, wherein the optical element has a surface that is facing the inside of the process chamber, a wall section surrounding the optical element in said plane, wherein the wall section has a first section adjoining to one side of the optical element, the first section being a slanted section, the surface of which extends under an angle from said plane or a convex section, and a second section adjoining the first section, the second section being a hollow section having the shape of a hollow cylinder section or any other shape forming a groove, an axis of the hollow cylinder section or grove extending substantially in parallel to the first side of the optical element, a first inlet for a gas, which is arranged at said first section at a position facing the optical element and which is directed substantially tangentially to the surface of the optical element, and a second inlet for gas, which is arranged at a position at said second section opposite to the position where said second section adjoins said first section and which is directed substantially in the same direction as the first inlet.

12. Method according to claim 11, characterized by a step of processing the material in the process chamber by means of a laser beam.

13. Method according to claim 11, wherein the first gas flow and the second gas flow are substantially laminar.

* * * * *